(12) United States Patent
Kumar et al.

(10) Patent No.: US 9,883,538 B2
(45) Date of Patent: Jan. 30, 2018

(54) AVOIDING P2P CONNECTION FAILURE DUE TO PUSH BUTTON CONFIGURATION OVERLAP

(71) Applicant: QUALCOMM Incorporated, San Diego, CA (US)

(72) Inventors: Chinamay Kumar, Hyderabad (IN); Ashish Kumar Agrawal, Hyderabad (IN); Krishna Chaitanya Suryavenkata Emani, Hyderabad (IN); Deepak Jindal Kumar, Hyderabad (IN); Anil Kumar Daga, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 638 days.

(21) Appl. No.: 14/470,534

(22) Filed: Aug. 27, 2014

(65) Prior Publication Data

US 2016/0066353 A1 Mar. 3, 2016

(51) Int. Cl.
| G06F 15/16 | (2006.01) |
| H04W 76/02 | (2009.01) |
| H04W 12/06 | (2009.01) |
| H04W 12/04 | (2009.01) |
| H04L 29/08 | (2006.01) |

(52) U.S. Cl.
CPC ......... *H04W 76/021* (2013.01); *H04W 12/06* (2013.01); *H04W 76/023* (2013.01); *H04L 67/141* (2013.01); *H04W 12/04* (2013.01)

(58) Field of Classification Search
CPC . H04W 76/021; H04W 76/023; H04W 12/04; H04W 12/06; H04L 67/141
See application file for complete search history.

(56) References Cited

U.S. PATENT DOCUMENTS

| 8,472,600 | B2 * | 6/2013 | Chen ................. H04L 29/12754 370/352 |
| 9,363,672 | B2 * | 6/2016 | Bahr ....................... H04L 63/08 |
| 2011/0202643 | A1 | 8/2011 | Goto |
| 2011/0268027 | A1 | 11/2011 | Nogawa |
| 2012/0227090 | A1 | 9/2012 | Shibuya |

(Continued)

FOREIGN PATENT DOCUMENTS

CN 103415012 A 11/2013

OTHER PUBLICATIONS

ISA/EPO, International Search Report and Written Opinion of the International Searching Authority, Int'l Appl. No. PCT/US2015/044767, Oct. 20, 2015, European Patent Office, Rijswijk, NL, 12 pgs.

(Continued)

*Primary Examiner* — Jonathan Bui
(74) *Attorney, Agent, or Firm* — Holland & Hart LLP/Qualcomm

(57) ABSTRACT

Methods, systems, and devices are provided that reduce delay in establishing connectivity between wireless devices when either device detects a session overlap condition during a wireless network setup. In response to detecting the session overlap condition at a first node, the first node made transmit a notification to a second node to switch from the first setup procedure to a second setup procedure using a vendor specific information element.

21 Claims, 9 Drawing Sheets

(56) References Cited

U.S. PATENT DOCUMENTS

2013/0170482 A1* 7/2013 Jung .................... H04W 8/005
370/338
2014/0092421 A1 4/2014 Shibata

OTHER PUBLICATIONS

WiFi ALLiANCE, Wi-Fi Simple Configuration Technical Specification, Version 2.0.2, Jan. 30, 2012, 155 pgs., XP_55050847A, Wi-Fi Alliance.

* cited by examiner

AVOIDING P2P CONNECTION FAILURE DUE TO PUSH BUTTON CONFIGURATION OVERLAP

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN) or Wi-Fi network may include an access point (AP) and a client device. The access point may be coupled to a network, such as the Internet, and enable the client device to communicate via the network (and/or communicate with other devices coupled to the access point).

Wi-Fi Direct, also referred to as Wi-Fi peer-to-peer (P2P), allows Wi-Fi enabled devices to directly connect with each other in an ad-hoc arrangement without a dedicated AP. Wi-Fi direct devices implement Wi-Fi Protected Setup (WPS) to establish a secure wireless connection with minimal user intervention. WPS allows for the establishment of a secure connection by either a push button configuration (PBC) procedure, a Personal Identification Number (PIN) procedure, or a Near Field Communication (NFC) procedure. Utilizing a PBC procedure, users may establish a connection between two devices by pushing a designated button on each device within a predetermined time period.

Devices attempting to establish communication utilizing the PBC procedure may experience "overlap" when either device detects an additional device (i.e., an interfering device) attempting to use PBC during the negotiation period. In such instance, each device may enter a session overlap state where the devices decline to associate with any network using PBC for a designated time period (e.g., 120 seconds). As a result, multiple devices within range of each other in a congested environment may experience significant delays when concurrently attempting to use PBC to establish P2P connections.

SUMMARY

Methods, systems, and devices are provided to reduce delay in establishing connectivity between two wireless devices when either device detects a session overlap condition, such as a push button configuration (PBC) overlap, during a wireless network setup. When the session overlap condition is detected by a first device, the first device may transmit to a second node a notification to switch from a first setup procedure to a second setup procedure using a vendor specific information element. For example, after detecting a session overlap condition overlap, the wireless devices may dynamically switch from a PBC procedure to a PIN-based procedure to set up the wireless network without waiting for the prescribed time period (e.g., 120 seconds) typically associated with PBC overlaps. The vendor-specific information element (IE) may be a component of a provision discovery (PD) request, a probe request or response, or other message exchanged between the devices during the wireless network setup. As a result, both devices may avoid entering the session overlap state and establish a wireless connection.

In a first set of illustrative examples, a method for wireless communication is provided. The method may include detecting, at a first node, a session overlap condition during a wireless network setup for a second node utilizing a first setup procedure; and in response to detecting the session overlap condition, transmitting to the second node a notification to switch from the first setup procedure to a second setup procedure using a vendor specific information element.

In some examples, the first setup procedure may comprise a push button configuration (PBC) setup procedure and the second setup procedure may comprise a personal identification number (PIN) setup procedure. Generating a PIN associated with the second setup procedure may be in response detecting the session overlap condition. The PIN may be generated using a function common to the first and second nodes. In some examples, a secure connection may be established between the first and second nodes using the generated PIN. In certain examples, establishing the secure connection may include receiving a second PIN from the second node and comparing the PIN generated at the first node to the second PIN received from the second node.

Additionally or alternatively, generating a PIN associated with the second setup procedure may be based at least in part on a media access control (MAC) address for the first node and/or the second node.

In some examples, detecting the session overlap condition may include transmitting a probe request and receiving, at the first node, a plurality of responses to the probe request. In accordance with the present disclosure, the predefined message may include a provision discovery message. Additionally or alternatively, transmitting the notification to the second node may include using beacons to notify the second node to switch from the first setup procedure to the second setup procedure. In some examples, the first node may be selected from a group consisting of: a peer-to-peer group owner or a peer-to-peer client device.

In a second set of illustrative examples, an apparatus for wireless communication is provided. The apparatus may include an overlap condition detector to detect, at a first node, a session overlap condition during a wireless network setup between the first node and a second node utilizing a first setup procedure; and a notification manager to, in response to detecting the session overlap condition, transmit to the second node a notification to switch from the first setup procedure to a second setup procedure using a vendor specific information element. In certain examples, the apparatus may implement one or more aspects of the method for wireless communications described above with respect to the first set of illustrative examples.

In a third set of illustrative examples, an apparatus for wireless communication is provided. The apparatus may include means for detecting, at a first node, a session overlap condition during a wireless network setup for a second node utilizing a first setup procedure; and means for, in response to detecting the session overlap condition, transmitting to the second node a notification to switch from the first setup procedure to a second setup procedure using a vendor specific information element In certain examples, the apparatus may implement one or more aspects of the method for wireless communications described above with respect to the first set of illustrative examples.

In a fourth set of illustrative examples, a non-transitory computer-readable medium is provided. The non-transitory computer-readable medium may comprise computer-readable instructions that, when executed by a processor, may cause the processor to detect, at a first node, a session overlap condition during a wireless network setup for a second node utilizing a first setup procedure; and in response to detecting the session overlap condition, transmit to the second node a notification to switch from the first setup procedure to a second setup procedure using a vendor specific information element. In certain examples, the non-transitory computer-readable medium may implement one or more aspects of the method for wireless communications described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present disclosure describes techniques for reducing delay in connectivity in a peer-to-peer wireless communication system. As noted above, in some cases, Wi-Fi enabled nodes may experience delays in establishing connectivity when operating in a congested environment. For instance, Wi-Fi Protected Setup (WPS) allows for the establishment of a secure peer-to-peer connection between two nodes using a push button configuration (PBC) procedure, a Personal Identification Number (PIN) procedure, or a Near Field Communication (NFC) procedure. However, a first node and a second node attempting to establish communication utilizing a push button configuration (PBC) procedure may experience "overlap" when either the first node or the second node detects a third node (i.e., an interfering device) also attempting to use the PBC procedure during a negotiation period.

Examples of the present disclosure may reduce the delays associated with establishing communication between nodes in a peer-to-peer wireless communication system by dynamically switching from a PBC procedure to a PIN procedure following a detection of an overlap condition. In some cases the overlap condition may be a session overlap error. The node identifying the PBC overlap condition may notify the other of the detected overlap condition and the decision to dynamically switch from a PBC to a PIN procedure to establish secure communication between the nodes. The node identifying the PBC overlap condition may provide the notification of the switch from the PBC to the PIN-based procedure using a vendor-specific information elements (IEs) in a predefined message, such as a probe request, a probe reply, a provision discovery request, a provision discovery response, and/or a beacon signal.

The following description provides examples, and is not limiting of the scope, applicability, or configuration set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

As used herein, the term "Wi-Fi" refers to a Wireless Local Area Network (WLAN) or device that implements a version of the 802.11 family of standards from the Institute of Electrical and Electronics Engineers (IEEE).

Figure 1:
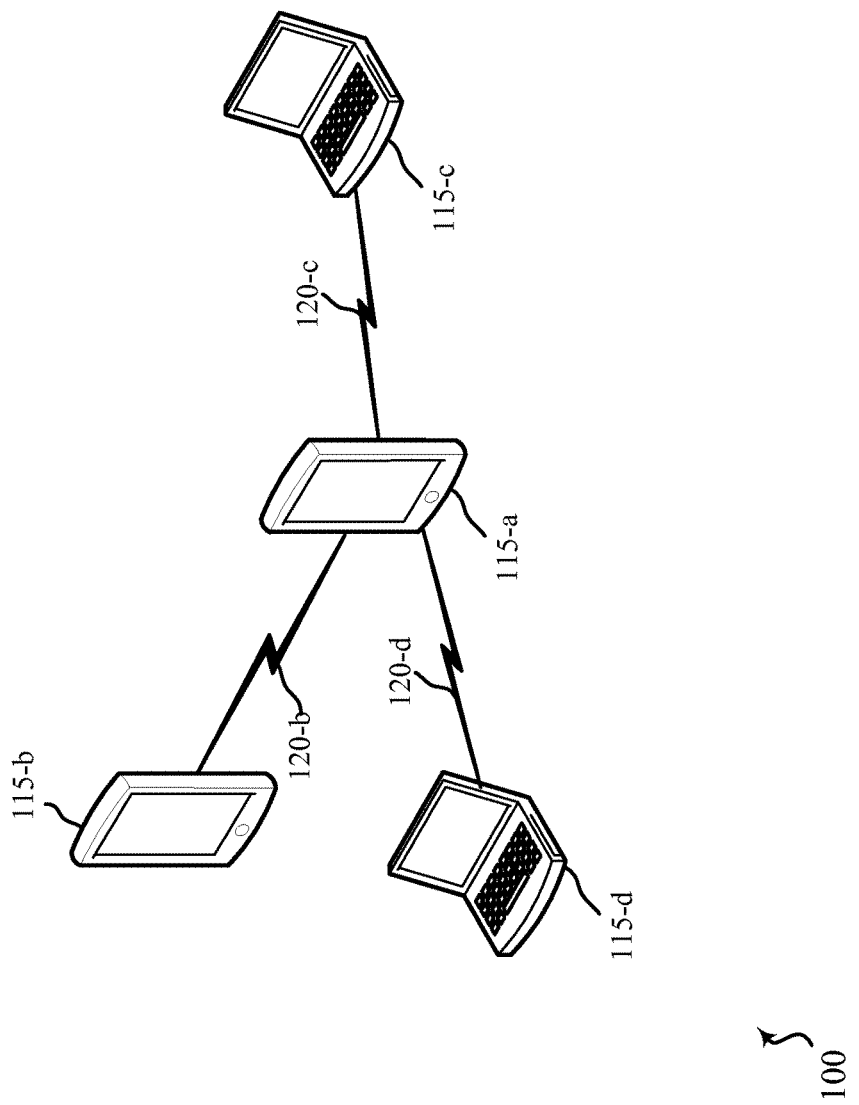
FIG. 1 shows a block diagram of a wireless peer-to-peer arrangement, in accordance with the principles of the present disclosure.

Referring first to FIG. 1, a peer-to-peer (P2P) arrangement 100 is shown that may allow devices to communicate with each other in the absence of a controlling access point. The peer-to-peer arrangement 100 may include various fixed and/or mobile devices that may be referred to as "nodes" 115. For example, a node 115 may be a cellular phone, a personal digital assistant (PDA), a tablet computer, a laptop computer, a wearable item such as a watch or glasses, or other wireless device. A node 115-a may communicate directly with other nodes 115-b, 115-c, and 115-d using respective peer-to-peer wireless connections 120-b, 120-c, and 120-d. One example of a peer-to-peer wireless connection is a Wi-Fi Direct connection. A Wi-Fi Direct connection may conform to the Institute of Electrical and Electronics (IEEE) 802.11 family of standards. Additionally or alternatively, the peer-to-peer wireless connections 120 may conform to other wireless standards.

Each of the nodes 115 may be categorized as a group owner (GO) node or as a client node, in accordance with a Wi-Fi Direct peer-to-peer wireless connection. Nodes 115 attempting to connect with each other in either one-to-one or one-to-many configuration negotiate their roles in the connection. Any P2P node 115 may take the role of a P2P GO or P2P client during the negotiation process. Thus, based on the negotiation, one node (e.g., node 115-*a*) may assume the traditional role of an AP and establish itself as a GO. In such an example, other nodes (e.g., nodes 115-*b*, 115-*c*, or 115-*d*) in the network may follow as client nodes to join the network or the group.

Prior to establishing any connection, the nodes 115 must discover each other. Thus, each node 115 may alternate between listening and sending probe requests with P2P vendor specific information elements (IEs) on social channels. Unconnected P2P nodes (e.g., nodes 115-*b*, 115-*c*, or 115-*d*) and a GO (e.g., node 115-*a*) may reply to the probe request with probe response frames, including P2P vendor specific IEs describing the node characteristics. The node characteristics may include user-defined device name, device type (e.g., cellular phone, laptop computer, television, or printer), supported WPS configuration methods (e.g., PBC, or PIN), supported operating channels, and/or dynamic WPS switching capabilities.

Following the GO negotiation and node discovery process, the client node (e.g., nodes 115-*b*, 115-*c*, or 115-*d*) may connect with the GO node (e.g., node 115-*a*) on a negotiated channel to exchange credentials in accordance with the WPS procedures. In some examples, the WPS procedures may include a PBC procedure or a PIN procedure to establish secure communication between nodes 115-*a* and 115-*b*. In accordance with the PBC procedure, a button may be pressed on each node 115-*a* and node 115-*b* within a predetermined time period (e.g., 90 seconds) to establish secure P2P wireless connection. However, if another node (e.g., node 115-*d*) attempts to connect with the GO node 115-*a* within the same time period, the GO node 115-*a* may receive a probe request/response from multiple nodes 115-*b* and 115-*d*. As a result, the GO node 115-*a* may detect an overlap condition.

In response to the overlap condition, the GO node 115-*a* may dynamically switch from a PBC procedure to a PIN procedure to establish secure communication with the client node 115-*b*. This switch may occur without entering the session overlap state where the GO node 115-*a* and the client node 115-*b* would both otherwise decline to associate with any node for a designated time period (e.g., 120 seconds). In some examples, the GO node 115-*a* may dynamically switch from a PBC procedure to a PIN procedure responsive to a determination that both the GO node 115-*a* and the client node 115-*b* support dynamic WPS switching. This determination may be based on information previously exchanged between nodes during the discovery process. For example, both the GO node 115-*a* and client node 115-*b* may exchange node characteristics during the discovery process that expressly indicate whether each node 115-*a* and 115-*b* supports dynamic WPS switching capabilities. For example, dynamic WPS switching capabilities may be indicated utilizing one or more bits in a vendor-specific information element transmitted during probe request/response, provisional discovery request/response or any other message exchanged between nodes 115-*a* and 115-*b*. Alternatively, support for dynamic WPS switching may be inferred based on known attributes of the GO node 115-*a* or the client node 115-*b*.

In one example, the GO node 115-*a* may detect an overlap condition and signal to the client node 115-*b* a decision to dynamically switch the WPS configuration from a PBC procedure to a PIN procedure. This decision may be signaled to the client node 115-*b* via a message addressed to the client node 115-*b* and/or by a beacon signal transmitted by the GO node 115-*a*. For instance, the GO node 115-*a*, upon detection of an overlap condition and determination to switch to a PIN based procedure, may begin beaconing vendor specific information elements indicative of the overlap condition on a negotiated channel. In response, the client node 115-*b* may detect the beacon signal and continue establishing the P2P connection by switching a WPS configuration of the client node 115-*b* from the PBC procedure to the PIN based procedure. In one example of the present disclosure, the GO node 115-*a* and the client node 115-*b* may each use a common algorithm to generate a unique PIN internally to be used in a Wi-Fi Simple Configuration (WSC) frame exchange without user intervention. In some examples, the common algorithm may be based on a pseudo-random number generator with a seed that is common to both the GO node 115-*a* and the client node 115-*b*. Additionally or alternatively, the PIN may be generated using a MAC address of the GO node 115-*a* or the client node 115-*b*. Additionally or alternatively, the user may be prompted to enter the PIN on the client node to complete secure connection.

In accordance with examples of the present disclosure, detection of the overlap condition is not limited solely to the GO node 115-*a*. Additionally or alternatively, the client node 115-*b* may also detect the probe request or response from the interfering node 115-*d* during the predetermined time period. Thus, the client node 115-*b* may identify an overlap condition. The client node 115-*b* may signal the detection of the overlap condition and subsequent decision by the client node 115-*b* to dynamically switch the WPS configuration from PBC to PIN by issuing a second provision discovery request to the GO node 115-*a* via wireless connections 120-*b*. The second provision discovery request may further include P2P vendor specific IEs describing characteristics of the client node 115-*b*. In one example, the vendor specific IEs may indicate the PIN method as the supported WPS configuration method for the second provision discovery request.

Figure 2:
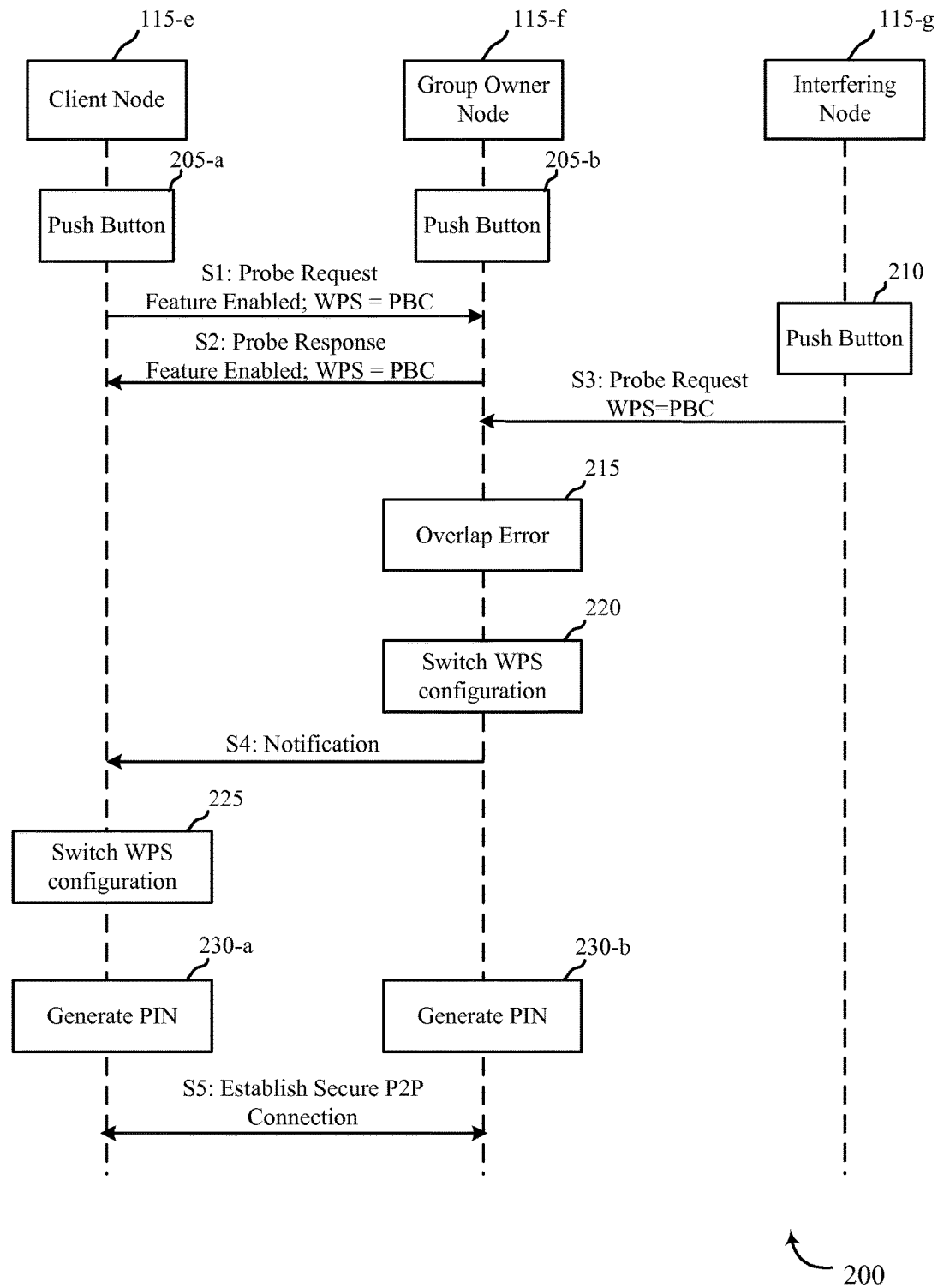
FIG. 2 shows a message flow diagram illustrating a flow of communication between multiple nodes in accordance with the principles of the present disclosure.

FIG. 2 shows a message flow diagram 200 illustrating one example of communication between a client node 115-*e*, a GO node 115-*f*, and an interfering node 115-*g*. Each of the client node 115-*e*, group owner node 115-*f*, and an interfering node 115-*g* may be an example of one of the nodes 115 described above with reference to FIG. 1. In one configuration, the client node 115-*e* and GO node 115-*f* may initiate a wireless P2P connection when a button 205 is pressed on each node respectively to trigger a Wi-Fi direct P2P connectivity. In response, the client node 115-*e* and GO node 115-*f* may enter a device discovery phase to establish secure connection.

In some examples, the device discovery phase may include a client node 115-*e* transmitting a probe request S1 to the GO node 115-*f*. The probe request may include a P2P information element describing the client node 115-*e* characteristics, including whether the client node 115-*e* supports dynamic WPS switching capabilities. In one example, one or more vendor-specific information element bits may be assigned to "1" to denote that the client node 115-*e* is configured to support dynamic WPS switching and that the feature is enabled. The GO node 115-*f* may alternatively listen and reply to the probe request S1 with a probe response frame S2. Similar to the probe request, the probe response frame S2 may include a P2P information element indicating a support for dynamic WPS switching as one of the characteristics of the GO node 115-*f*. In this example, each of the probe request and response may further identify the initial WPS configuration as using a PBC method. As discussed above, the node characteristics included in the P2P information element may further include user-defined device name, device type (e.g., cellular phone, laptop computer, television, or printer), supported WPS configuration methods (e.g., PBC, PIN, Near Field Communication (NFC), Bluetooth/Bluetooth Low Energy (BLE), infrared, optical, etc.), and/or supported operating channels. In other examples, the node characteristics may be transmitted in provision discovery request/reply frames and/or any other messages exchanged between the client node 115-*e* and the GO node 115-*f*.

During the setup phase, a button 210 may also be pressed on an interfering node 115-*g* to elicit a connection with the GO node 115-*f*. As a result, the GO node 115-*f* may receive a probe request S3 from the interfering node 115-*g*. Reception of multiple probe requests (i.e., S1 and S3) from a plurality of nodes (i.e., client node 115-*e* and interfering node 115-*g*) during a setup phase may trigger an overlap condition 215. As a result, the GO node 115-*f* may dynamically switch the WPS configuration 220 from a PBC procedure to a PIN-based or other wireless network setup procedure to establish secure communication with the client node 115-*e* without entering an overlap state.

While the present example describes the switch in WPS configuration in the context of a switch from the PBC procedure to the PIN procedure, these same principles may be applied to switches between other types of wireless network setup procedures. For example, in response to the detected overlap condition, the GO node 115-*f* may switch from the PBC procedure to a Near Field Communication (NFC), Bluetooth/Bluetooth Low Energy (BLE), optical, (e.g., using a QR code, bar code, printed text, or other optical representation of credentials) and/or other applicable wireless network setup procedure (e.g., credentials may be sent through other means in order to setup the wireless connection, such as through passing credentials through an existing BLE connection, QR scan, or the other aforementioned means). In some examples, a wireless network setup procedure may be selected based on the capabilities of the client node 115-*e*.

In one example, the GO node 115-*f* may switch the WPS configuration only if the GO node 115-*f* has confirmation (e.g., via Probe Request S1) that the client node 115-*e* is configured to support dynamic WPS switching and that the feature is enabled on both the client node 115-*e* and the GO node 115-*f*. In the event that the client node 115-*e* does not support dynamic WPS switching or if the feature is not enabled, each node may enter a session overlap state where both the GO node 115-*f* and the client node 115-*c* may decline to associate with any network using PBC for a designated time period (e.g., 120 seconds).

In some examples, the GO node 115-*f* may further notify S4 the client node 115-*e* of the detected overlap condition and the decision by the GO node 115-*f* to switch the WPS configuration from PBC procedure to the PIN based procedure. The notification S4 may include a message or vendor specific IEs transmitted in a beacon to the client node 115-*e*. In turn, the client node 115-*e* may switch its respective WPS configuration 225 to mirror that of the GO node 115-*f*. In one example of the present disclosure, the GO node 115-*f* and the client node 115-*e* may each use a common algorithm shared between the nodes to internally generate a PIN 230 without user intervention. In some examples, the common algorithm may be based on a pseudo-random number generator or a MAC address of the GO node 115-*f* or the client node 115-*e*. Following the generation of a PIN 230 at each node respectively, the client node 115-*e* and group owner node 115-*f* may establish the secure P2P connection S5. In some examples, the user may be prompted to enter the PIN on the client node 115-*e* to complete the secure connection.

Figure 3:
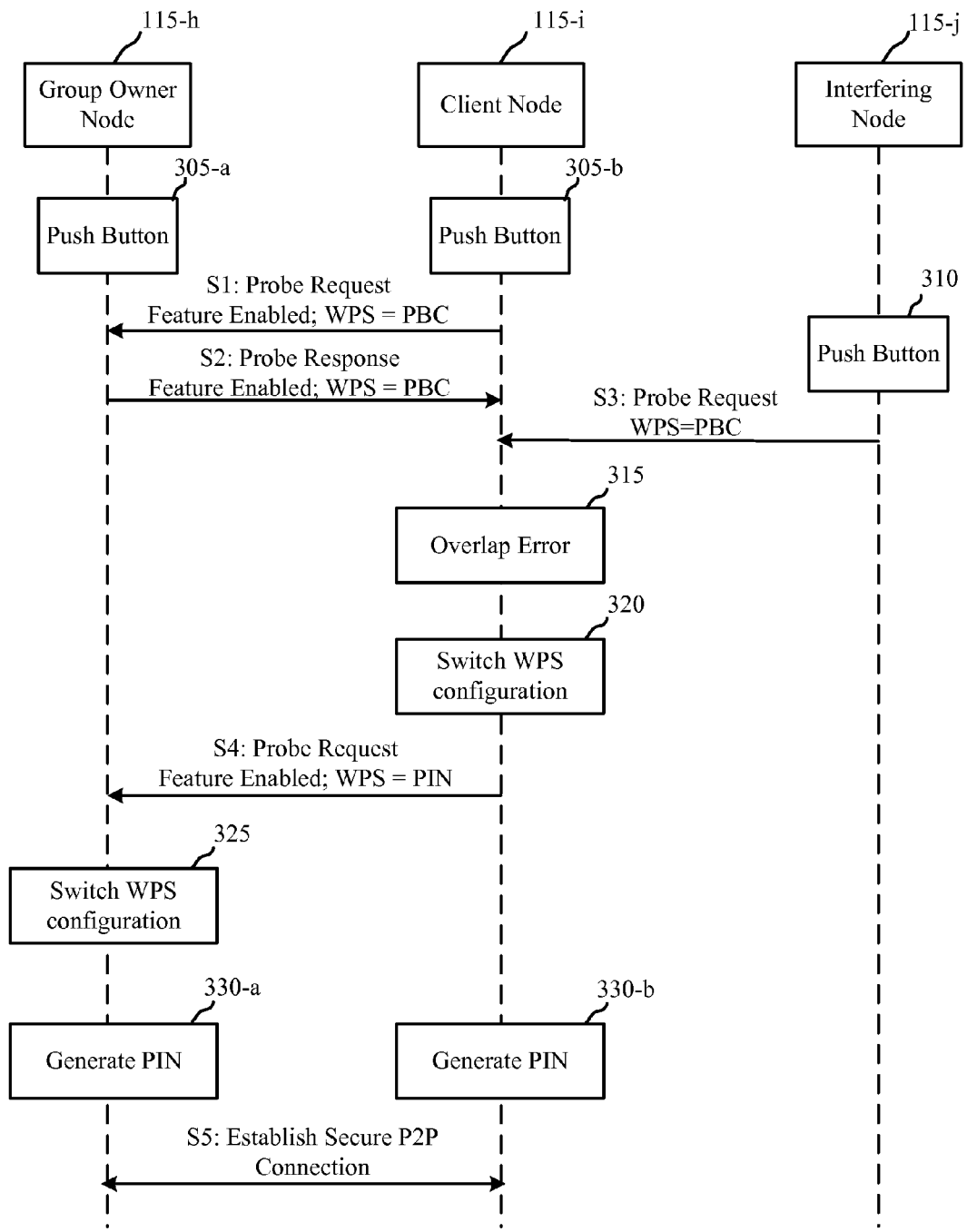
FIG. 3 shows a message flow diagram illustrating a flow of communication between multiple nodes in accordance with another principle of the present disclosure.

Now turning to FIG. 3, a message flow diagram 300 illustrates another example of communication between a client node 115-*h*, GO node 115-*i*, and an interfering node 115-*j*. Each of the GO node 115-*h*, client node 115-*i* and an interfering node 115-*j* may be an example of nodes 115 with reference to FIGS. 1 and/or 2. In contrast to the disclosure above, FIG. 3 illustrates an example of a client node 115-*i* detecting an overlap condition and the process thereof to reduce delays associated with the Wi-Fi direct P2P connectivity.

In one configuration, the client node 115-*i* and the GO node 115-*h* may initiate a wireless P2P connection by pressing a button 305 on each node respectively to trigger a secure connection between the client node 115-*i* and the GO node 115-*h*. In response, the client node 115-*i* and the GO node 115-*h* may enter a device discovery phase. Similar to the disclosure above, the client node 115-*i* may issue a probe request S1 to the GO node 115-*h*. In turn, the GO node 115-*h* may reply to the probe request with a probe response frame S2. Each of the probe request and/or response may include node characteristics and capabilities identified by information elements. The node characteristics may include user-defined device name, device type (e.g., cellular phone, laptop computer, tablet, television, printer, etc.), supported WPS configuration methods (e.g., PBC, PIN, Near Field Communication (NFC), Bluetooth/Bluetooth Low Energy (BLE), infrared, optical, etc.), supported operating channels and/or dynamic WPS switching capabilities.

In one example, an interfering node 115-*j*, during the setup phase, may again press a button 310 to elicit a connection with the GO node 115-*h*. However, the probe request S3 transmitted by the interfering node 115-*j* and intended for the GO node 115-*h* may be received at the client node 115-*i* instead. Upon reception of the probe request S3 during the setup phase, the client node 115-*i* may trigger an overlap condition 315 and thus switch its WPS configuration 320 from a PBC procedure to a PIN-based or other wireless network setup procedure.

The client node 115-*i* may notify the GO node 115-*h* of the detected overlap condition and the decision to switch the WPS configuration by issuing a second probe request S4 to the GO node 115-*h*. The second probe request S4 may reset the WPS configuration from PBC to the PIN based procedure using vendor specific information elements. Based in part on the second probe request from the client node 115-*i*, the GO node 115-*h* may switch its WPS configuration 325 to reflect the modification adapted in the client node 115-*i*. In some examples, the GO node 115-*h* and the client node 115-*i* may initiate secure connection using a PIN based procedure by using a common algorithm shared between the nodes to internally generate a PIN 330 without user intervention. In some examples, the common algorithm may be based on a pseudo-random number generator or a MAC address of the GO node 115-*h* and/or the client node 115-*i*. Following the generation of a PIN 330 at each node respectively, the client node 115-*i* and group node 115-*h* may establish a secure P2P connection S5. Alternatively or additionally, the client node 115-*i* may also use vendor specific action frames to notify the GO node 115-*h* of the switch from the PBC procedure to the PIN-based or other setup procedure.

Again, while the present example describes the switch in WPS configuration in the context of a switch from the PBC procedure to the PIN procedure, these same principles may be applied to switches between other types of wireless network setup procedures. For example, in response to the detected overlap condition, the GO node 115-*f* may switch from the PBC procedure to a PBC, PIN, Near Field Communication (NFC), Bluetooth/Bluetooth Low Energy (BLE), optical, (e.g., using a QR code, bar code, printed text, or other optical representation of credentials) and/or other applicable wireless network setup procedure (e.g., credentials may be sent through other means in order to setup the wireless connection, such as through passing credentials through an existing BLE connection, QR scan, or the other aforementioned means). In some examples, a wireless network setup procedure may be selected based on the capabilities of the client node 115-*e*.

Figure 4:
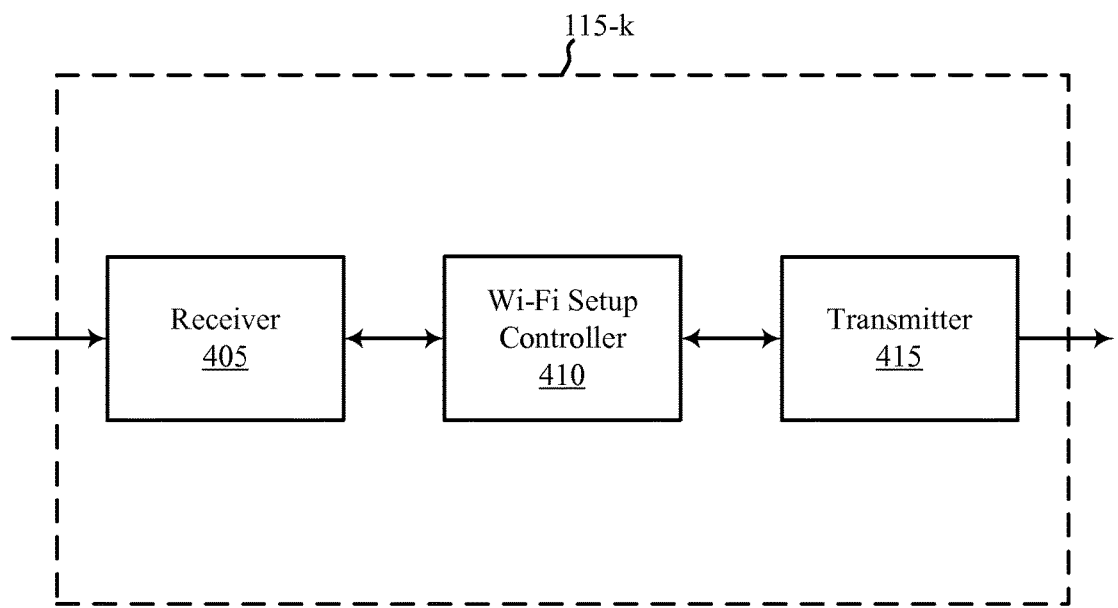
FIG. 4 shows a block diagram illustrating one example of a node in accordance with the principles of the present disclosure.

Referring now to FIG. 4, a block diagram 400 illustrates an example of a node 115-*k* in accordance with various examples. The node 115-*k* may be an example of one of the nodes 115 described with reference to FIGS. 1, 2 and/or 3. In some examples, the node 115-*k* may also be a processor. The node 115-*k* may include a receiver 405, a Wi-Fi setup controller 410, and a transmitter 415. Each of these components may be in communication with each other. The node 115-*k* may be an example of a client node or a group owner node.

The components of the node 115-*k* may, individually or collectively, be implemented with application-specific integrated circuits (ASICs) adapted to perform some or all of the applicable functions in hardware. Alternatively, the functions may be performed by other processing units (or cores), on integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by general or application-specific processors.

The transmitter 415 may send communications from the node 115-*k* to other nodes, such as the nodes 115 of the peer-to-peer arrangement 100 shown in FIG. 1. These communications may include messages notifying the other nodes 115 of the overlap condition detection and/or the decision to dynamically switch WPS configuration from a first wireless network setup procedure to a second wireless network setup procedure. The Wi-Fi setup controller 410 may manage such communications sent by the node 115-*k*. The receiver 405 may receive communications from other nodes, such as the nodes 115 of the peer-to-peer arrangement 100 shown in FIG. 1. Such received communications may include messages for controlling the Wi-Fi setup controller 410 of the node 115-*k*. The Wi-Fi setup controller 410 may manage such communications received by the node 115-*k*.

The Wi-Fi setup controller 410 may be configured to establish a Wi-Fi Direct P2P communication between node 115-*k* and another node in the network. The Wi-Fi setup controller 410 may generate and respond to probe requests, provisional discovery requests and other messages as related to establishing secure P2P connectivity. These functions may include transmitting vendor specific information elements to identify node 115-*k* characteristics, including user-defined device name, device type, supported WPS configuration methods (e.g., PBC, PIN, Near Field Communication (NFC), Bluetooth/Bluetooth Low Energy (BLE), infrared, optical, etc.), supported operating channels, and/or dynamic WPS switching capabilities. As discussed above, the dynamic WPS switching capability of the node 115-*e* may be signaled to other nodes utilizing one or more bit(s) in a vendor-specific information element. For example, a vendor specific information element bit set to "1" may indicate that the node 115-*e* is capable of supporting dynamic WPS switching. Conversely, a vendor specific information element bit set to "0" may indicate that the node 115-*e* is a legacy device incapable of supporting dynamic WPS switching.

The Wi-Fi setup controller 410 may further be configured to detect an overlap condition upon receiving a probe request/response, provisional discovery request/response from a plurality of nodes in the network. Reception of multiple requests and responses from more than one node may signal that an interfering node is attempting to join a secure group. As a result, the Wi-Fi setup controller 410 may signal the detection of the overlap condition and decision to switch WPS configuration from PBC procedure to a PIN-based or other wireless network setup procedure to other nodes by either generating a message or initiating a beacon signal modulated onto the network.

Figure 5:
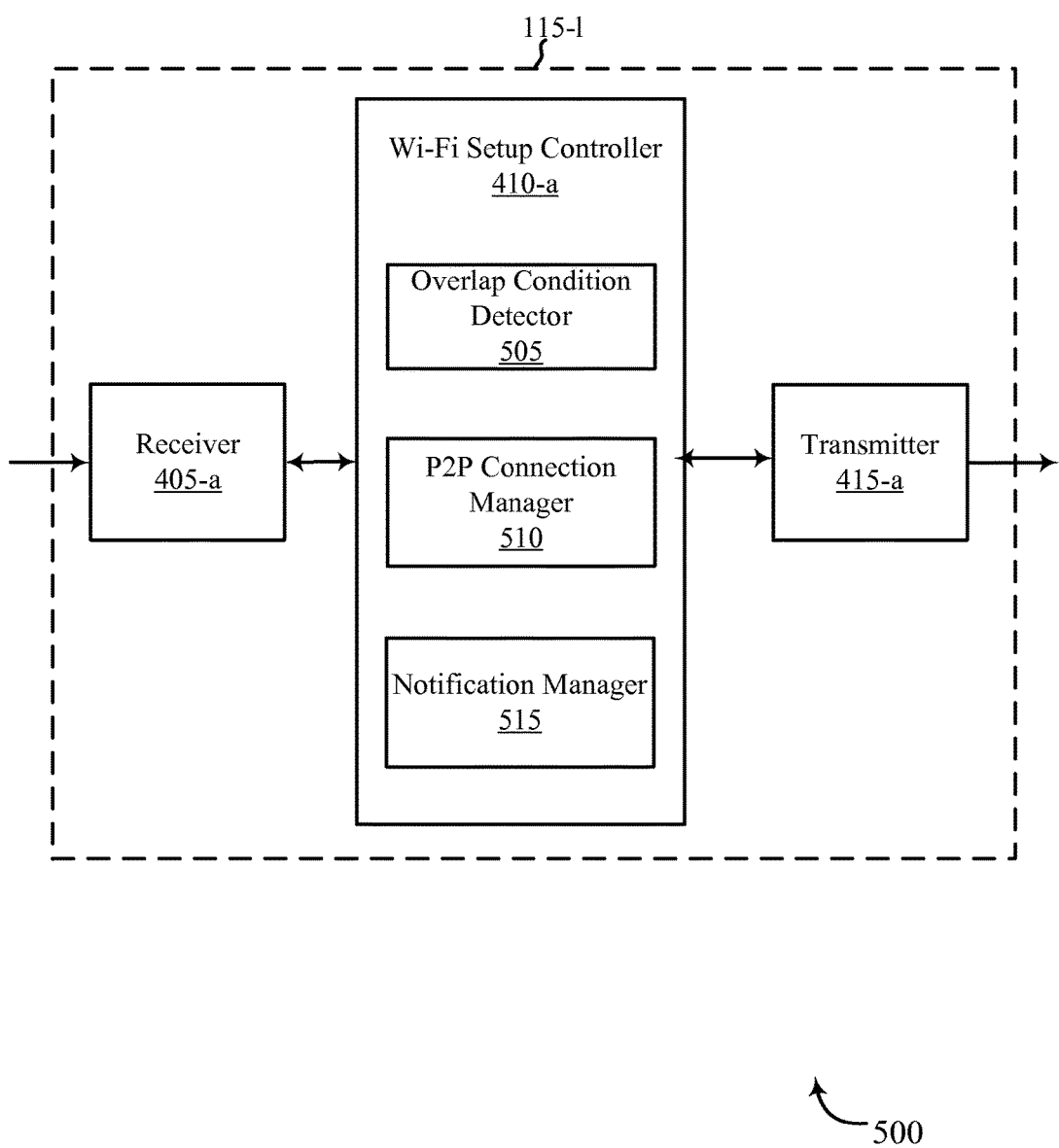
FIG. 5 shows a block diagram illustrating another example of a node in accordance with the principles of the present disclosure.

FIG. 5 is a block diagram 500 illustrating another example of a node 115-1 in accordance with various examples. The node 115-1 may be an example of the nodes 115 described with reference to FIGS. 1, 2, 3 and/or 4. In some examples, the node 115-1 may also be a processor. The node 115-1 may include a receiver 405-*a*, a Wi-Fi setup controller 410-*a*, and a transmitter 415-*a*. Each of these components may be in communication with each other. The node 115-1 may be an example of a client node or a group owner node.

The components of the node 115-1 may, individually or collectively, be implemented with application-specific integrated circuits (ASICs) adapted to perform some or all of the applicable functions in hardware. Alternatively, the functions may be performed by other processing units (or cores), on integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by general or application-specific processors.

The receiver 405-*a* and the transmitter 415-*a* may be examples of receiver 405 and transmitter 415, respectively, and may be configured to perform operations as previously described with reference to FIG. 4. The Wi-Fi setup controller 410-*a* may be an example of Wi-Fi setup controller 410 shown in FIG. 4 and may include an overlap condition detector 505, a P2P connection manager 510, and a notification manager 515.

The Wi-Fi setup controller 410-*a* may be configured to perform the various functions described above with respect to FIGS. 2, 3 and/or 4. In this example, the Wi-Fi setup controller 410-*a* may be configured to reduce the delay associated with establishing secure communication between the node 115-1 and another node (e.g., one of the nodes 115 described above with reference to FIG. 1). The node 115-1 or the Wi-Fi setup controller 410-*a* may include a processor for performing such functionality.

In one example, an overlap condition detector 505 may be configured to detect a session overlap condition during a wireless network setup between the node 115-1 and a second node. In some examples, the session overlap may be detected during utilization of the PBC procedure to establish secure communication. In some examples, the overlap condition detector 505 may determine whether signals (e.g., probe request/response, provisional discovery request/response, or other messages) received at node 115-1 during a wireless network setup process may be requests from a plurality of nodes in the network. In the event that the node 115-1 determines that a received signal corresponds with more than one request, the overlap condition detector 505 may determine to trigger a session overlap. In one example, when the node 115-1 transmits a probe request to establish secure P2P communication using a PBC procedure, and in response receives a plurality of replies from multiple nodes prior to an expiration of a setup period, the overlap condition detector may trigger a session overlap condition.

In some examples, a P2P connection manager 510 may switch a wireless network setup procedure for a target node from a PBC procedure to a PIN-based or other setup procedure (e.g., NFC, Bluetooth/BLE, optical, etc.) in response to the detected session overlap condition. When a switch is made to the PIN-based setup procedure, the P2P connection manager 510 may generate a unique PIN. The node 115-$k$ and the target node (not shown) may independently generate the same unique PIN using a shared function, such as a shared pseudorandom number generator having the same seed. In certain examples, the PIN may be based at least in part on the media access control (MAC) address of the group owner node and/or the client node. In some examples, the node 115-$k$ and the target node may then establish the wireless network using the independently generated PINs, and users of the nodes may not be aware that the switch from the PBC procedure to the PIN-based procedure occurred. Additionally or alternatively, the P2P connection manager 510 may provide an indication of the generated PIN (e.g., display the generated PIN on the graphical user interface (not shown) on the node 115-1 and receive a second PIN from another node in the network. In such instances, the P2P connection manager 510 may complete the wireless network setup based on a comparison of the first PIN generated by the node 115-1 and a second PIN generated by another node in the network. A secure connection between the nodes may be established based on a determination that the first PIN matches the second PIN.

In certain examples, a notification manager 515 may transmit a notification of the detected session overlap condition and the decision to switch from PBC setup procedure to a PIN based setup procedure using vendor specific information element of a predefined message. The predefined message may be probe request/response, provisional discovery request/response, vendor specific action frames or other messages transmitted between node 115-1 and another node in the network. In some examples, the notification manager 515 may also be configured to transmit characteristics and capabilities of node 115-1 to other nodes in the network. The node characteristics may include user-defined device name, device type (e.g., cellular phone, laptop computer, television, or printer), supported WPS configuration methods (e.g., PBC, or PIN), supported operating channels and/or dynamic WPS switching capabilities. The notification manager 515 may further utilize vendor specific information element of a predefined message to indicate whether the node 115-1 is capable of supporting dynamic WPS switching and whether the dynamic WPS switching feature is enabled in the node 115-1.

Figure 6:
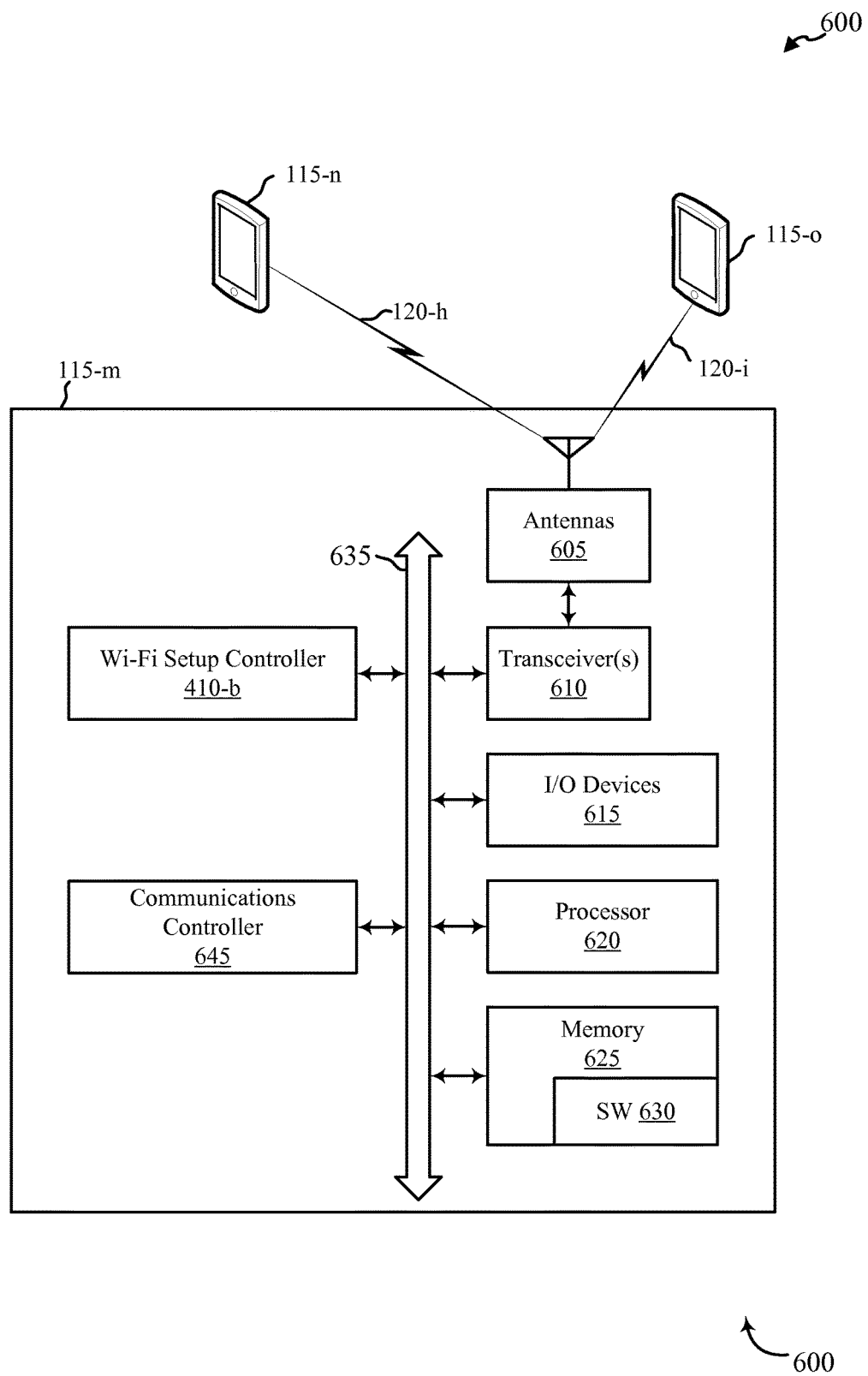
FIG. 6 shows a block diagram of a node for use in a peer-to-peer wireless communication, in accordance with the principles of the present disclosure.

FIG. 6 shows a block diagram 600 of a node 115-$m$ for use in a peer-to-peer wireless communication, in accordance with various examples. The node 115-$m$ may be an example of the nodes 115 described with reference to FIGS. 1, 2, 3, 4 and/or 5. The node 115-$m$ may be an example of a group owner node or a client node.

The node 115-$m$ may include antenna(s) 605, transceiver(s) 610, I/O devices 615, a processor 620, and a memory 625, which each may be in communication, directly or indirectly, with each other, for example, via bus 635. The transceiver 610 may be configured to communicate bi-directionally, via the antennas 605, with the other nodes 115-$n$ and/or 115-$o$ via peer-to-peer wireless connections 120-$h$ and 120-$i$, respectively. The transceiver 610 may include a modem configured to modulate the packets and provide the modulated packets to the antennas 605 for transmission, and to demodulate packets received from the antennas 605. The transceiver 610 may be configured to maintain multiple concurrent communication links using the same or different radio interfaces (e.g., Wi-Fi, cellular, etc.). The node 115-$m$ may include a single antenna 605, or the node 115-$g$ may include multiple antennas 605. The node 115-$m$ may be capable of employing multiple antennas 605 for transmitting and receiving communications in a multiple-input multiple-output (MIMO) communication system.

The node 115-$m$ may also include a communications controller 645, which may manage communications with other 115, such as nodes 115-$n$ and 115-$o$ as shown in FIG. 6, via the transceiver 610 and antennas 605. The node 115-$m$ may have any of various configurations. The node 115-$m$ may, in some cases have an internal power supply, such as a small battery, to facilitate mobile operation.

The memory 625 may include random access memory (RAM) and read-only memory (ROM). The memory 625 may store computer-readable, computer-executable software 630 containing instructions that are configured to, when executed, cause the processor 620 to perform various functions described herein. Alternatively, the computer-executable software 630 may not be directly executable by the processor 620 but be configured to cause the node 115-$g$ (e.g., when compiled and executed) to perform functions described herein. The processor 620 may include an intelligent hardware device, e.g., a central processing unit (CPU), a microcontroller, an application specific integrated circuit (ASIC), etc. In some examples, the memory 625 stores parameters associated with the power save modes and categories of data connections.

According to the architecture of FIG. 6, the node 115-$m$ further includes a Wi-Fi setup controller 410-$b$. The Wi-Fi setup controller 410-$b$ may implement the techniques describe above for reducing delay in establishing secure connection with other nodes, as described in reference to FIGS. 1-5. By way of example, these components of the node 115-$m$ may be in communication with some or all of the other components of the node 115-$m$ via bus 635. Additionally or alternatively, functionality of these components may be implemented via the transceiver 610, as a computer program product stored in software 630, and/or as controller elements of the processor 620. In some examples, the Wi-Fi setup controller 410-$b$ may be implemented as subroutines in memory 625/software 630, executed by the processor 620. In other cases, these components may be implemented as sub-modules in the processor 620 itself.

Figure 7:
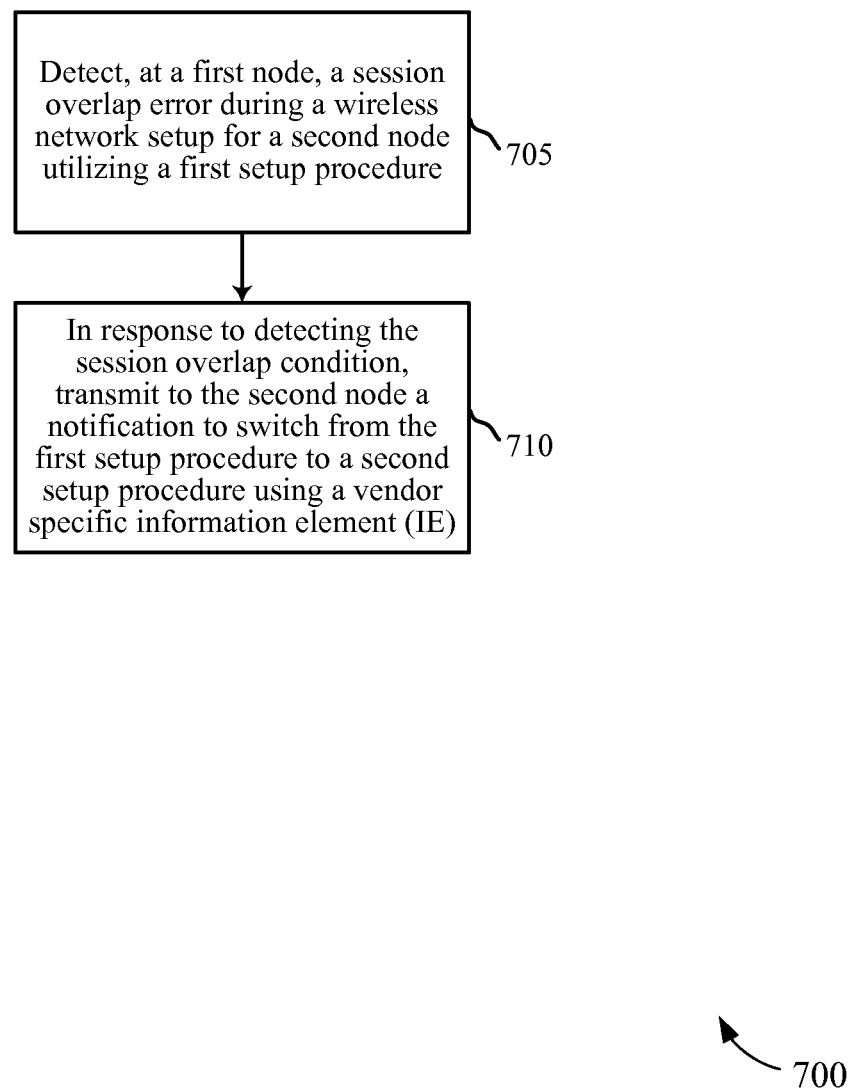
FIG. 7 is a flowchart illustrating an example of a method performed by a node in accordance with the principles of the present disclosure.

FIG. 7 is a flowchart illustrating an example of a method 700 performed by a node to establish secure connection, in accordance with the principles of this disclosure. For clarity, the method 700 is described with reference to the nodes 115 described with reference to FIGS. 1-6. In one implementation, the processor 620 described with reference to FIG. 6 may execute sets of codes to control the functional elements of a node 115 to perform the functions described below.

At block 705, a first node may detect a session overlap condition during a wireless network setup for a second node utilizing a first setup procedure. In some examples, the first setup procedure may comprise a push button configuration (PBC) setup procedure. Either of the first node or the second node may be an example of a client node or a group owner node described above. The operation(s) of block 705 may be performed by the overlap condition detector described with reference to FIG. 5.

At block 710, the first node may, in response to detecting the session overlap condition, transmit to the second node a notification to switch from the first setup procedure to a second setup procedure using a vendor specific information element (IE). In some examples the second setup procedure may be a PIN based setup procedure. Alternatively, the second setup procedure may be an NFC setup procedure, a Bluetooth or BLE setup procedure, an optical setup procedure, or another applicable setup procedure. In certain examples, switching the negotiation process may include generating a PIN associated with the second setup procedure. The PIN may be generated by the first node using a function common to both the first and the second node, such as a pseudorandom function. A secure connection between the first and second node may be established based in part on the generated PIN. In some instances, the generated PIN associated with the second setup procedure may be based at least in part on the MAC address of the first node and/or the second node. The predefined message may be probe request/response, provisional discovery request/response, or other messages transmitted between node 115-1 and another node in the network. The operation(s) of block 710 may be performed by the P2P connection manager 510 and the notification manager 515 described with reference to FIG. 5.

Figure 8:
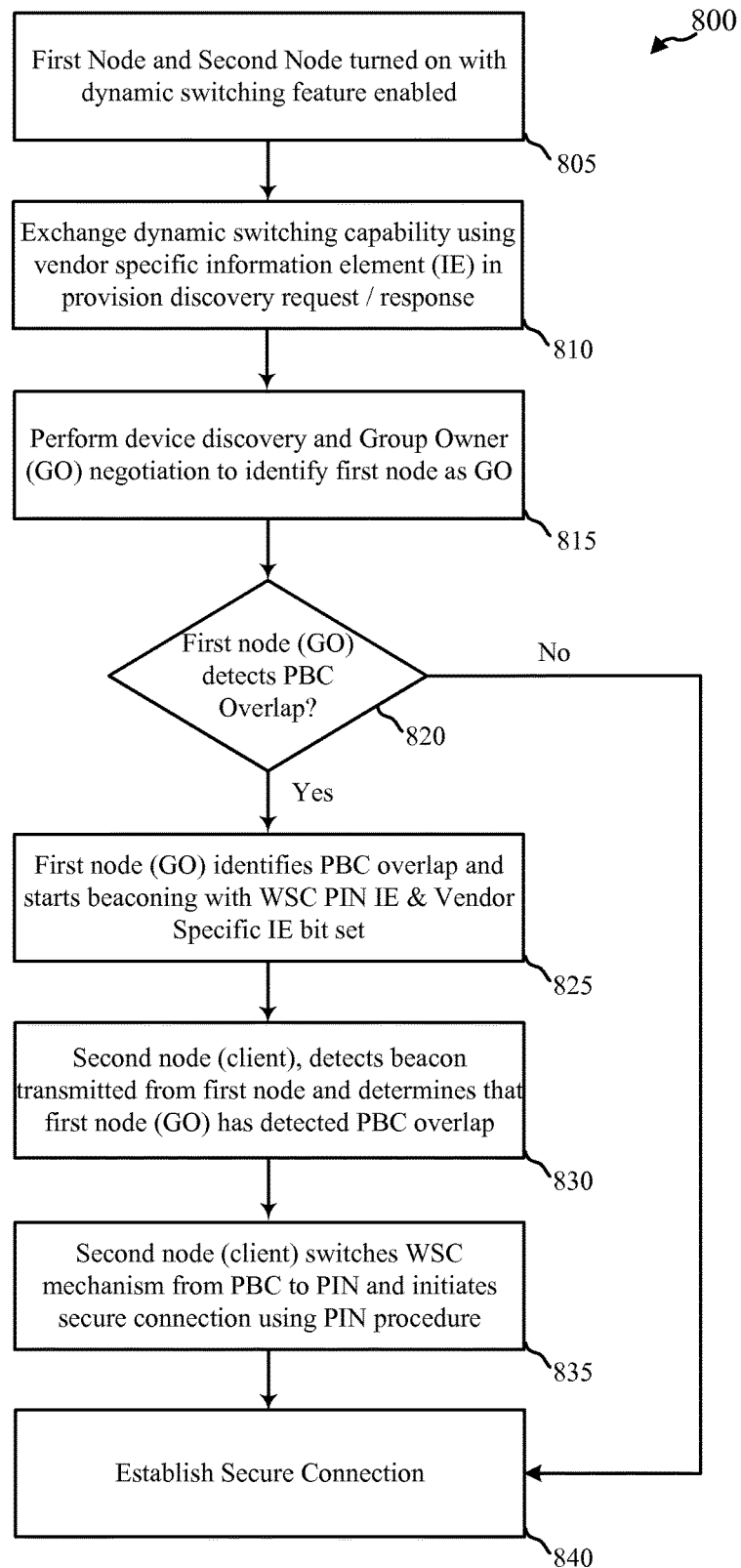
FIG. 8 is a flowchart illustrating an example of a method performed by a node in accordance with the principles of the present disclosure.

FIG. 8 is a flowchart illustrating an example of a method 800 performed by a node to establish secure connection, in accordance with the principles of this disclosure. For clarity, the method 800 is described with reference to the nodes 115 described with reference to FIGS. 1-6. In one implementation, the processor 620 described with reference to FIG. 6 may execute sets of codes to control the functional elements of a node 115 to perform the functions described below.

At block 805, the first and second nodes may be turned on with a dynamic switching feature enabled. Each of the first node and second node may be an example of a GO node or a client node. At block 810, the first and second nodes may exchange dynamic switching capabilities using a vendor specific information element in a predefined message. In some examples, the predefined message may be a probe request or response message, a provisional discovery request or response message, or other message transmitted between the first and second node. The exchange of information may include node characteristics, including device names, device types, supported WPS configuration methods, and/or supported operating channels.

At block 815, the nodes may enter a device discovery and group owner negotiation phase. In some examples, it may be necessary to decide which node will function as a group owner (i.e., AP for the group). The group owner negotiation may be performed using Wi-Fi management messages (e.g., action frames) to complete a negotiation handshake. In the illustrated example, the first node may be identified as a group owner. Following the decision to elect the first node as a group owner, the group owner negotiation confirmation may be transmitted to the second node and both nodes may move to the negotiated operating channel. In some instances, the first node (GO) may begin to operate in an AP mode by sending beacons with a negotiated service set identifier (SSID).

At block 820, the group owner may determine whether the first node has detected a PBC overlap by way of receiving predefined messages from a plurality of nodes in the network during the setup phase. If the first node does not trigger a PBC overlap, the process may proceed to block 840, where a secure Wi-Fi direct connection is established between the first and second nodes. Alternatively, if the method determines that a session overlap has occurred during the setup phase, the first node may identify, at block 825, the PBC overlap and start to beacon a WSC PIN information element and a vendor specific information element bit to the second node.

At block 830, the second node (i.e., client node) may detect the beacon signals from the first node and determine that the first node has detected a PBC overlap. As a result, the second node, at block 835, may switch its WSC mechanism from PBC to PIN and initiate a secure connection using the PIN setup procedure. In one example of the present disclosure, the first and second node may each use a function common to the first node and the second node to generate a unique PIN internally to be used in a WSC frame exchange without user intervention. In some examples, a common algorithm may be based on a pseudo-random number generator or a MAC address of the first node and/or the second node. At block 840, the first and second nodes may establish a secure Wi-Fi direct connection using the generated PIN.

Figure 9:
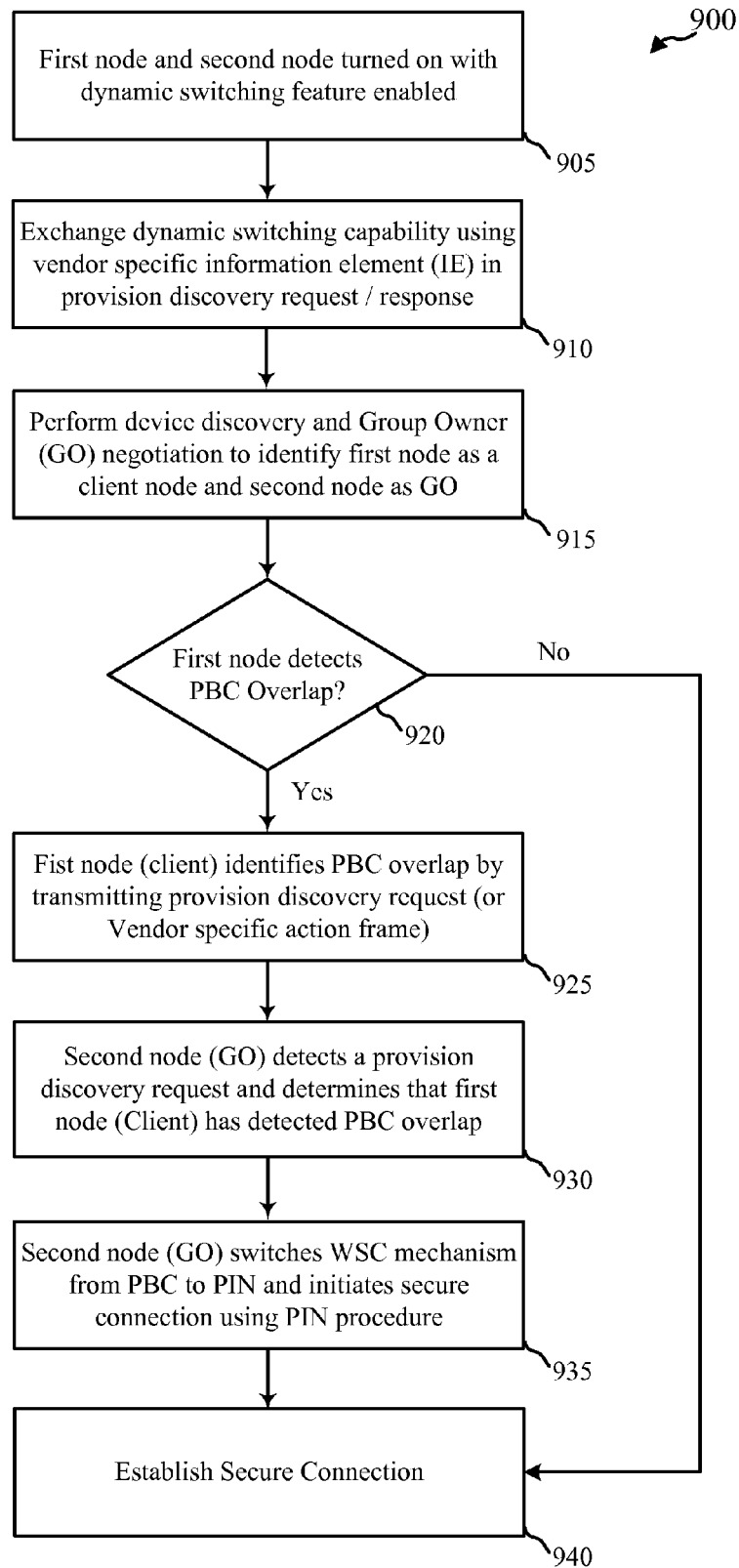
FIG. 9 is flowchart illustrating another example of a method performed by a node in accordance with the principles of the present disclosure.

FIG. 9 is a flowchart illustrating an example of a method 900 performed by a system comprising a client node and a group owner node establishing a secure connection, in accordance with the principles of this disclosure. For clarity, the method 900 is described with reference to the nodes 115 described with reference to FIGS. 1-6. In one implementation, the processor 620 described with reference to FIG. 6 may execute sets of codes to control the functional elements of a node 115 to perform the functions described below.

At block 905, the first and second nodes may each be turned on with a dynamic switching feature enabled. Each of the first and second node may be an example of a client node or a GO node. At block 910, the first and second nodes may exchange dynamic switching capabilities using a vendor specific information element in a predefined message. For example, a vendor specific information element bit set to "1" may identify the first node or the second node as capable of supporting dynamic WPS switching. Conversely, a vendor specific information element bit set to "0" may identify that the first node or second node is a legacy device incapable of supporting dynamic WPS switching. In some examples, the predefined message may be a probe request or response message, a provisional discovery request or response message, or another message transmitted between the first node and the second node. The exchange of information may include node characteristics, including device names, device types, supported WPS configuration methods, and/or supported operating channels.

At block 915, the nodes may enter a device discovery and group owner negotiation phase. In some examples, it may be necessary to decide which node is to function as a group owner (i.e., AP for the group). The group owner negotiation may be performed using Wi-Fi management messages (e.g., action frames) to complete a negotiation handshake. In the illustrated example, the first node may be identified as a client node, while the second node may be identified as a group owner. Following the decision to elect the second node as the group owner, the group owner negotiation confirmation may be transmitted to the first node and both nodes may move to the negotiated operating channel. In some instances, the second node (GO) may begin to operate in an AP mode by sending beacons with a negotiated service set identifier (SSID).

At block 920, the client node may determine whether it has detected a PBC overlap by way of receiving predefined messages from a plurality of nodes in the network during the setup phase. If the client node does not trigger a PBC overlap, the process may proceed to block 940, where a secure Wi-Fi direct connection is established between the first and second nodes. Alternatively, if the method determines that a session overlap has occurred during the setup phase, the client node may identify, at block 925, the detected PBC overlap and subsequent decision by the client node to dynamically switch the WPS configuration from PBC to PIN by issuing a second provision discovery request to the GO node. In some examples, the second provision discovery request may further include P2P vendor specific IEs describing characteristics of the client node. In one instance, the vendor specific IEs may indicate the PIN procedure as the supported WPS configuration for the second provision discovery request.

At block 930, the second node (i.e., GO node) may detect the provision discovery request from the first node (client node) and determine that the client node has detected a PBC overlap. As a result, the second node (i.e., GO node), at block 935, may switch its WSC mechanism from PBC to PIN and initiate secure connection using the PIN setup procedure. In one example of the present disclosure, the first and second nodes may each use a function common to the first node and the second node to generate a unique PIN internally to be used in a WSC frame exchange without user intervention. In some examples, a common algorithm may be based on a pseudo-random number generator or a MAC address of the first node and/or the second node. At block 940, the first and second nodes may establish secure Wi-Fi direct connection using the generated PIN.

The detailed description set forth above in connection with the appended drawings describes examples and does not represent the only embodiments that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
   detecting, at a first node, a session overlap condition during a wireless network setup for a second node utilizing a first setup procedure;

in response to detecting the session overlap condition, transmitting to the second node a notification to switch from the first setup procedure to a second setup procedure using a vendor specific information element, wherein the second setup procedure comprises a personal identification number (PIN) setup procedure;

generating a PIN associated with the second setup procedure in response to detecting the session overlap condition, wherein the PIN is generated using a function common to the first node and the second node;

receiving a second PIN from the second node;

comparing, internally at the first node, the PIN generated at the first node to the second PIN received from the second node; and establishing a secure connection between the first node and the second node using the generated PIN based at least in part on the comparing the PIN generated at the first node to the second PIN received from the second node.

2. The method of claim 1, wherein the first setup procedure comprises a push button configuration (PBC) setup procedure.

3. The method of claim 1, wherein generating the PIN associated with the second setup procedure is based at least in part on a media access control (MAC) address for at least one from the group consisting of: the first node and the second node.

4. The method of claim 1, wherein detecting the session overlap condition comprises:

transmitting a probe request; and receiving, at the first node, a plurality of responses to the probe request.

5. The method of claim 1, wherein transmitting the notification to the second node comprises using a provision discovery message.

6. The method of claim 1, wherein transmitting the notification to the second node comprises using beacons to notify the second node to switch from the first setup procedure to the second setup procedure.

7. The method of claim 1, wherein the first node is one the group consisting of: a peer-to-peer group owner and a peer-to-peer client device.

8. An apparatus for wireless communication, comprising:

an overlap condition detector to detect, at a first node, a session overlap condition during a wireless network setup between the first node and a second node utilizing a first setup procedure;

a notification manager to, in response to detecting the session overlap condition, transmit to the second node a notification to switch from the first setup procedure to a second setup procedure using a vendor specific information element, wherein the second setup procedure comprises a personal identification number (PIN) setup procedure; and a P2P connection manager to:

generate a PIN associated with the second setup procedure in response to detecting the session overlap condition, wherein the PIN is generated using a function common to the first node and the second node, receive a second PIN from the second node, compare, internally at the first node, the PIN generated at the first node to the second PIN received from the second node, and establish a secure connection between the first node and the second node using the generated PIN based at least in part on the comparing the PIN generated at the first node to the second PIN received from the second node.

9. The apparatus of claim 8, wherein the first setup procedure comprises a push button configuration (PBC) setup procedure.

10. The apparatus of claim 8, wherein generating the PIN associated with the second setup procedure is based at least in part on a media access control (MAC) address for at least one from the group consisting of: the first node and the second node.

11. The apparatus of claim 8, wherein detecting the session overlap condition comprises:

transmitting a probe request; and receiving, at the first node, a plurality of responses to the probe request.

12. The apparatus of claim 8, wherein transmitting the notification to the second node comprises using a provision discovery message.

13. The apparatus of claim 8, wherein transmitting the notification to the second node comprises using beacons to notify the second node to switch from the first setup procedure to the second setup procedure.

14. The apparatus of claim 8, wherein the first node is one from the group consisting of: a peer-to-peer group owner and a peer-to-peer client device.

15. An apparatus for wireless communication, comprising:

means for detecting, at a first node, a session overlap condition during a wireless network setup for a second node utilizing a first setup procedure;

means for, in response to detecting the session overlap condition, transmitting to the second node a notification to switch from the first setup procedure to a second setup procedure using a vendor specific information element, wherein the second setup procedure comprises a personal identification number (PIN) setup procedure;

means for generating a PIN associated with the second setup procedure in response to detecting the session overlap condition, wherein the PIN is generated using a function common to the first node and the second node;

means for receiving a second PIN from the second node;

means for comparing, internally at the first node, the PIN generated at the first node to the second PIN received from the second node; and means for establishing a secure connection between the first node and the second node using the generated PIN based at least in part on the comparing the PIN generated at the first node to the second PIN received from the second node.

16. The apparatus of claim 15, wherein the first setup procedure comprises a push button configuration (PBC) setup procedure.

17. The apparatus of claim 15, wherein generating the PIN associated with the second setup procedure based at least in part on a media access control (MAC) address for at least one from the group consisting of: the first node and the second node.

18. The apparatus of claim 15, wherein detecting the session overlap condition comprises:

transmitting a probe request; and receiving, at the first node, a plurality of responses to the probe request.

19. The apparatus of claim 15, wherein transmitting the notification to the second node comprises using beacons to notify the second node to switch from the first setup procedure to the second setup procedure.

20. A non-transitory computer-readable medium comprising computer-readable instructions that, when executed by a processor, cause the processor to:
- detect, at a first node, a session overlap condition during a wireless network setup for a second node utilizing a first setup procedure;
- in response to detecting the session overlap condition, transmit to the second node a notification to switch from the first setup procedure to a second setup procedure using a vendor specific information element, wherein the second setup procedure comprises a personal identification number (PIN) setup procedure;
- generate a PIN associated with the second setup procedure in response to detecting the session overlap condition, wherein the PIN is generated using a function common to the first node and the second node;
- receive a second PIN from the second node;
- compare, internally at the first node, the PIN generated at the first node to the second PIN received from the second node; and
- establish a secure connection between the first node and the second node using the generated PIN based at least in part on the comparing the PIN generated at the first node to the second PIN received from the second node.

21. The non-transitory computer-readable medium of claim 20, wherein the first setup procedure comprises a push button configuration (PBC) setup procedure.

* * * * *